OTHER REFERENCES

Johnson et al.: "In Vivo and in Vitro Laboratory Observations on Bacitracin" (paper presented at conference on Antibiotic Research, in Washington, D. C., on January 31, and February 1, 1947, under auspices of the Antibiotic Study Section of the National Institute of Health, Bethesda, Md.), page 2.

Kuehl et al.: Science, vol. 102, pages 34 and 35 (1945).

Kuehl et al.: J. Am. Chem. Soc., vol. 68, pages 1460–1462 (1946).

Cheronis: "Semimicro and Macro Organic Chemistry" (Crowell, New York, 1942), pages 26 and 27.

Goorley: "Some Chemical and Physical Properties of Bacitracin" (presented at conference on Antibiotic Research in Washington, D. C. on January 31, and February 1, 1947, under auspices of Antibiotics Study Section of the National Institute of Health, Bethesda, Md.).

Color Index, 1st edition (1924), pages 35 and 165.

Patented June 12, 1951

2,556,375

UNITED STATES PATENT OFFICE 2,556,375

RECOVERY OF BACITRACIN FROM FERMENTATION BROTHS

Peter P. Regna, Woodcliff, N. J., and Isaiah A. Solomons, III, Jackson Heights, N. Y., assignors to Chas. Pfizer & Co., Inc., Brooklyn, N. Y., a corporation of New Jersey No Drawing. Application July 28, 1947, Serial No. 764,246

6 Claims. (Cl. 167—65)

This invention relates to the recovery of bacitracin from crude aqueous solutions such as fermentation broths, and it has for its object to provide a novel and improved process for this purpose.

Another object of the invention is to provide an efficient and economical method of precipitating bacitracin from fermentation broths in the form of a novel dye salt.

Another object is to recover bacitracin from fermentation broths by precipitation with 1-(4-chloro-o-sulfophenyl)-5-hydroxy-3-methyl-4-(p-(p-tolylsulfonoxy)-phenylazo)-pyrazole, a dye which is also known as Polar Yellow 5G and Milling Yellow 5G.

Another object is to provide a novel and improved process for separating bacitracin from bacitracin dye salts.

Still another object is to provide an efficient and economical method of separating bacitracin from bacitracin Polar Yellow 5G salt.

Various other objects and advantages will be apparent as the nature of the invention is more fully described.

Bacitracin, an antibiotic, can be produced by fermentation in shallow layers of tryptone, beef infusion, savita, or amigen broth, in a soybean digest broth and in a synthetic medium in which 1-glutamic acid provides the source of nitrogen and dextrose the source of carbohydrate. The antibiotic is produced by a Gram-positive sporulating bacillus of the B. subtilis group, which was isolated by Johnson, Anker and Meleney (Science, October 12, 1945, page 376) from cultures of the contaminated tissue removed at operation from a compound fracture of the tibia. The bacitracin has been found to be a potent antibacterial agent when applied locally in certain surgical infections caused chiefly by Gram-positive organisms. Meleney and Johnson (J. A. M. A., March 8, 1947, page 675) have found it to be effective in the treatment of furuncles, deep and superficial abscesses, infected sebaceous cysts, etc.

It has been reported that the antibiotic can be recovered from the fermentation broth either by adsorption on charcoal, aluminum oxide, etc., or by extraction with butyl alcohol.

We have now discovered that bacitracin is almost quantitatively precipitated from fermentation broths in the form of a dye salt by combining the bacitracin in the growth medium with the monosodium salt of 1-(4-chloro-o-sulfophenyl)-5-hydroxy-3-methyl-4-(p-(p-tolylsulfonoxy)-phenylazo)-pyrazole, a certified color indicated as Ext. D & C Yellow No. 4 by the Food and Drug Administration. Although the broth can be treated with the dye at any pH within pH 2 to 9 (outside these limits of hydrogen ion concentration, the bacitracin is not very stable), for best results we prefer to carry out the precipitation at pH 2.

The microbiological assays for the determination of the antibacterial potencies, hereinafter referred to, were carried out by two procedures: (1) By a method similar to the Schmidt and Moyer method (J. Bact., Vol. 47, P. 199, (1944)) for penicillin; however, the organism which was used was a Staphylococcus aureus (A. T. C. #157); (2) By a turbidimetric method essentially the same as the method of McMahan (J. Biol. Chem., Vol. 153, P. 249 (1944)) except that S. aureus (A. T. C. #157) was used as the test organism. The bacitracin samples were compared against a standard provided by Dr. Frank L. Meleney of Columbia University.

The invention also relates to a method of recovering bacitracin of high antibiotic activity from bacitracin salts of 1-(4-chloro-o-sulfophenyl)-5-hydroxy-3-methyl-4-(p-(p-tolylsulfonoxy)-phenylazo)-pyrazole, and is based upon our discovery of a novel method of accomplishing the separation of the bacitracin dye salt into its two components. The preferred technique for this is to dissolve the bacitracin Polar Yellow 5G salt in dilute alkali, and then to extract the bacitracin dye into aqueous butyl alcohol, amyl alcohol, phenyl "cellosolve," etc. The necessary conditions for carrying out this procedure are the following: (1) The solution of the dissolved bacitracin dye salt is to be kept below pH 9, (2) The organic solvent for the bacitracin dye salt is to be reasonably immiscible with water, (3) The free acid of Polar Yellow 5G is to be soluble in the organic phase, even when the latter is diluted with other organic solvents for purposes of depressing the solubility of the bacitracin, as will be described below, and (4) The acidity during the transference of the bacitracin into water, from the mixture of organic solvents, is to be maintained such that the bacitracin does not re-combine with the free acid of Polar Yellow 5G dye in the organic phase and still is not of so high an acidity as to inactivate the bacitracin. The acidity during this latter extraction can be maintained by any organic or inorganic acid which serves to drive the bacitracin from the organic solvent into the aqueous phase.

Example 1

Six liters of a bacitracin fermentation broth (25 U./ml.) was adjusted to pH 2.1 with dilute